Patented Jan. 11, 1938

2,104,849

UNITED STATES PATENT OFFICE 2,104,849

CELLULOSE PROCESS

Rollin F. Conaway, Wilmington, Del., assignor to E. I. du Pont de Nemours & Company, Wilmington, Del., a corporation of Delaware No Drawing. Application February 1, 1935, Serial No. 4,524

19 Claims. (Cl. 260—102)

This invention relates to the saponification of esters, more particularly to the saponification of cellulose esters, and still more particularly to the saponification of the organic esters of cellulose by an alcoholysis method.

It is known that cellulose is rapidly degraded by alkali in the presence of oxygen. Primarily all of the methods employed in the prior art for completely saponifying cellulose esters are based on the use of alkali either in aqueous, alcoholic, or pyridine media and therefore are subject to the danger of degradation of the cellulose during the saponification. The acid hydrolysis method such as the phosphoric acid method for regenerating the cellulose from its organic esters degrades the cellulose to such an extent that it is water-soluble. In addition to these disadvantages, the methods employed in the prior art are time consuming in that they require several hours to a day, depending upon the method, for complete saponification.

This invention has as an object the partial or complete saponification of the organic esters of cellulose. A further object is the regeneration of cellulose from its organic esters under essentially non-degrading conditions. A still further object is the reduction of the time of saponification as compared with the methods employed in the prior art. Other objects will appear hereinafter.

These objects are accomplished by the following invention wherein a high molecular weight organic acid ester of a poly-hydroxy compound is saponified by bringing such an ester, for example, a cellulose ester of an organic acid, in contact with an alcohol in the presence of a metal alcoholate.

The process of the present invention has two principal variations which may be called the homogeneous method and the heterogeneous method. These methods are as follows:

A. Homogeneous method

The dry organic ester of cellulose, such as cellulose acetate, benzoate, or acetate benzoate, to be saponified is dissolved in an anhydrous solvent such as acetone, dioxane, etc., or a mixed solvent, such as toluene-alcohol, etc., which is relatively inert to the metallic alcoholate. The resulting solution is then diluted to the extent of 25–100 per cent with an alcohol, such as methyl or ethyl alcohol. To this solution is added with rapid agitation at room temperature a small amount of sodium methylate (1–10 per cent based on the weight of the ester) in the form of a methyl alcohol solution. The solution is agitated until gelation occurs which usually requires from one to two minutes. The gel, which is a complex intermediate, is allowed to stand for a few minutes (30–60) with intermittent shaking in order for the reaction to become complete. The gel is then decomposed by the addition of water which leaves the cellulose in a semi-gelatinous highly swollen form. The solution is immediately filtered and washed neutral with distilled water. The higher the molecular weight of the substituent acid group in the cellulose, the longer is the time required for complete saponification. In the saponification of the higher esters of cellulose, such as cellulose butyrate, it is advisable to heat the gel intermediate for a few minutes (30–60) at a temperature of 50° prior to the addition of water.

This method of saponification is also applicable to the mixed esters of cellulose, such as cellulose acetate propionate, acetate butyrate, acetate benzoate, etc. The same procedure is employed as described above and the gel intermediate is allowed to stand for the same length of time as for the simple ester containing only the highest molecular weight acid radical present in the mixed ester.

It is extremely difficult to control the degree of saponification by the homogeneous method due to the rapidity of the reaction. However, a partial saponification can be accomplished by the homogeneous method by limiting the quantity of alcohol present in the reaction media. For partial saponification however, the heterogeneous method can be more easily controlled and is simplified by the fact that the ester does not have to be dissolved in a solvent prior to saponification.

By limiting the amount of alcohol, and particularly by the addition of a less rapidly acting alcohol such as propyl or butyl alcohol, partial saponification may be effected in the case of mixed esters such as cellulose acetate propionate, since the acetate is more readily hydrolyzed off than is the propionate. This process of partial saponification in a homogeneous system affords the possibility of saponifying the acetate group off to a large extent, leaving the propionate groups, to a large extent, unaffected. In view of the rapidity of the reaction, extremely good mixing is required for uniform results. The hydrolysis of a cellulose acetate propionate to a product largely consisting of propionate, is of course possible also in heterogeneous systems.

B. Heterogeneous method

The heterogeneous method, like the homogeneous, can be employed in the saponification of either simple or mixed esters of cellulose. It is primarily applicable to esters which are in an extended physical form, such as powders, films, foils, or yarns. The cellulose ester should be dried prior to saponification so that it does not contain sufficient water to destroy the alcoholate catalyst. The cellulose ester is immersed in an alcohol solution of an alcoholate (approximately 1 molar) at room temperature until the desired degree of saponification is obtained. The time of saponification depends on the particular cellulose ester being investigated and the physical form of the ester. Acetates are more easily saponified than propionates which in turn are more easily saponified than butyrates. Likewise, yarn or fabrics are more easily saponified than films. Furthermore, small changes in the concentration of the sodium methylate solution influence the rate of saponification. In the case of the higher esters, it is also desirable to increase the temperature at which the reaction is carried out to 40–80° C. After the desired degree of saponification is obtained, the ester is immersed in water which destroys the sodium methylate and the resulting cellulose material is purified by washing with water until neutral.

The metallic alcoholate such as sodium methylate, ethylate, monosodium glycerinate, etc., may be prepared by slowly adding small clean pieces of the metal, such as sodium, potassium, aluminum, etc., to the dry cool alcohol solution, and allowing the reaction to proceed until all of the metal is dissolved. Extreme care should be taken to exclude moisture during the preparation of the alcoholate.

The rate of reaction is influenced to a very considerable extent by the alcohol present in the reaction medium. The higher the molecular weight of the alcohol, the slower is the reaction. Monosodium glycerinate may be employed as the catalyst when methyl alcohol is present in the saponification bath. When monosodium glycerinate is employed as the catalyst and glycerine is the alcohol, little evidence of saponification could be detected after standing for several hours. Similarly, in the case of octadecyl alcohol. For this reason, lower molecular weight monohydric aliphatic alcohols and particularly methyl alcohol, are preferred. Similarly, sodium methylate is the preferred catalyst altho other alcoholates are satisfactory in the presence of lower aliphatic monohydric alcohols and particularly methyl alcohol.

Having outlined above the general principles and objects of the invention, the following exemplifications thereof to certain specific instances are included for purposes of illustration and not in limitation:

*Example 1.—(Cellulose acetate—homogeneous method)*

Ten grams of dry commercial flake cellulose acetate containing 54.5% of combined acetic acid was dissolved in 150 cc. of dry dioxane. This solution was diluted with 150 cc. of dry methyl alcohol. The resulting homogeneous solution was then cooled to 12° C. and 18 cc. of a 5% solution of sodium methylate in methyl alcohol added with constant shaking. In approximately 3–5 minutes the solution set to a gel which was allowed to stand with intermittent shaking in the water bath at 12° C. for 30 minutes. To this gel 150 cc. of ice water was added with constant shaking. The resulting cellulose in a highly swollen form was filtered, washed with water until neutral, and dried at 65° C. Analysis of the cellulose showed that it had been completely deacetylated.

*Example 2.—(Cellulose propionate—homogeneous method)*

Eight grams of cellulose propionate was dissolved in 100 cc. of dry dioxane. This solution was diluted with 100 cc. of dry ethyl alcohol. Ten cubic centimeters of a 5% solution of sodium methylate was added at room temperature with constant shaking. The solution gelled in approximately five minutes. The gel was allowed to stand for thirty minutes at room temperature prior to adding 100 cc. of distilled water. The resulting cellulose was filtered, washed neutral with water, and dried at 105° C. The weight of regenerated cellulose indicated that saponification was complete.

*Example 3.—(Cellulose acetate—sodium glycerinate—homogeneous method)*

Five grams of dry flake cellulose acetate containing 54.5% combined acetic acid was dissolved in 50 cc. of dioxane. This solution was diluted with 50 cc. of dry methyl alcohol. To the resulting homogeneous solution, 50 cc. of a 5% solution of monosodium glycerinate in glycerine was added with constant shaking at room temperature. After approximately 10 minutes of shaking, the solution gelled in the same manner as when sodium methylate is employed as the catalyst. The resulting gel was allowed to stand for 30 minutes at room temperature before adding 100 cc. of distilled water. The resulting cellulose was filtered, washed neutral with water and dried at 105° C.

*Example 4.—(Cellulose butyrate—homogeneous method)*

Eight grams of cellulose butyrate was dissolved in 150 cc. of dioxane and the resulting solution diluted with 150 cc. of dry methyl alcohol. To this solution 40 cc. of a 5% solution of sodium methylate in ethyl alcohol was added at room temperature with constant shaking. After approximately 10 minutes, the solution gelled. The resulting gel was allowed to stand at room temperature for one hour and then heated for 20 minutes at 50° C. prior to adding 100 cc. of distilled water. The resulting cellulose was filtered, washed neutral with water, and dried at 65° C. The weight of the resulting cellulose indicated that saponification was complete.

*Example 5.—(Cellulose acetate propionate—homogeneous method)*

One gram of dry cellulose acetate propionate was dissolved in 75 cc. of dioxane and the resulting solution diluted with 75 cc. of dry methyl alcohol. To this solution 5 cc. of a 5% solution of sodium methylate was added at room temperature with constant agitation. In approximately 3–5 minutes, a fine flocculant precipitate formed in the reaction medium. The solution containing the precipitated cellulose was agitated for one hour at room temperature prior to filtering, washing with water until neutral, then with alcohol and ether and drying at 105° C.

*Example 6.—(Cellulose acetate benzoate—homogeneous method)*

One gram of dry cellulose acetate benzoate was dissolved in 75 cc. of dioxane and the resulting solution diluted with 75 cc. of dry methyl alcohol. To this solution 5 cc. of a 5% solution of sodium methylate in methyl alcohol was added at room temperature with constant agitation. In approximately 3–5 minutes after the sodium methylate solution was added, a fine flocculant precipitate formed in the reaction medium. The resulting solution containing the precipitated cellulose was agitated for one hour at room temperature. To the resulting solution 25 cc. of methyl alcohol and 5 cc. of the 5% sodium methylate solution were added and the solution heated at 60° C. with agitation for an additional hour. The cellulose was then filtered, washed with alcohol, water until neutral, then with alcohol and ether, and dried at 105° C.

*Example 7.—(Cellulose acetate yarn—heterogeneous method)*

Small skeins of dry cellulose acetate yarn containing 54.5% of combined acetic acid were immersed at room temperature (25° C.) in a solution containing 150 cc. of methyl alcohol and 15 cc. of a 5% solution of sodium methylate in methyl alcohol for various lengths of time. The resulting skeins were washed with water until neutral and dried at 65° C. Skeins immersed in the solution for 30 seconds, 1 minute, 4 minutes, and 10 minutes, respectively, contained on analysis 44.89, 44.35, 24.02, and 6.87 per cent of combined acetic acid, respectively.

Resulting skeins of yarn were dyed with a cellulose acetate type dye (Celanthrene Brilliant Blue) and a viscose rayon type dye (Pontamine Sky Blue 6BX). The results obtained from the dyeing tests are as follows:

A. *Cellulose acetate type dye*

1. Original cellulose acetate yarn—dyed deep blue.
2. Saponified for 30 seconds—dyed slightly darker than original.
3. Saponified for 1 minute—dyed darker than original and possessed better luster.
4. Saponified for 4 minutes—dyed same depth as original but possessed poor luster.
5. Saponified for 10 minutes—only slightly stained.
6. Viscose rayon—did not dye.

B. *Viscose type dye*

1. Original cellulose acetate yarn—did not dye.
2. Saponified 30 seconds—did not dye.
3. Saponified 1 minute—did not dye.
4. Saponified 4 minutes—dyed darker than viscose rayon.
5. Saponified 10 minutes—dyed darker than viscose rayon.
6. Viscose rayon—dyed dark blue color.

This same series of tests was also carried out with cellulose acetate fabric in which on one series of experiments all of the fabrics were subjected to the saponifying solution and in another series in which only part of the fabric was saponified. In the latter series of tests in which only part of the fabric was saponified cross-dyeing effects were produced.

*Example 8.—(Cellulose acetate film—heterogeneous method)*

Dry cellulose acetate films approximately 0.005" thick containing 54.5% of combined acetic acid were immersed in a solution containing 500 cc. of methyl alcohol and 15, 30, 45, and 60 cc. of a 5% solution of sodium methylate respectively for 1, 2, 3, and 4 minutes. The resulting films were washed neutral with water and dried at 65° C. The treated films were not analyzed for acetic acid content but their difference in moisture sensitivity, brittleness, and dyeing characteristics indicated that the films had been saponified to different degrees.

The invention is not limited to the hydrolysis of cellulose esters of organic acids, but may also be applied to high molecular weight glycerides, polyvinyl acetate, and similar high molecular weight esters of organic polyhydric compounds. The rapidity and completeness of the reaction however, depends on the stability of the two types of esters which stability is determined in this case by the ease by which the complex ester is converted to the corresponding alcohol with the subsequent formation of the simple ester, such as ethyl acetate. The difference in the stability of the two esters may be influenced by a number of factors, such as free energy, negativity, steric hindrance, etc. In the application of this reaction to cellulose esters, there is a considerable difference in the stability of the cellulose esters and methyl acetate, and therefore the reaction favors the formation of cellulose and methyl acetate. In the case of the glycerides, polyvinyl acetate, etc., however, this difference in stability or potential is not nearly so great, therefore the reaction is much slower and has to be carried out at higher temperatures and under more drastic conditions than with cellulose esters.

The metal employed in the preparation of alcoholates may be lithium, sodium, potassium, calcium, magnesium, etc. In fact, any metal which will form an alcoholate, i. e., any metal above hydrogen in the electrochemical series may be employed. Thus, aluminum alcoholate is satisfactorily employed as a catalyst. The alkali metal alcoholates however, i. e., those of sodium, potassium, and the like, seem to be slightly more effective as catalysts than the alcoholates of the lesser basic metals.

While aliphatic monohydric lower molecular weight alcohols are preferred, aromatic alcohols such as benzyl alcohol, and polyhydric alcohols such as glycerol may be employed. Of the aliphatic alcohols the rate of reaction decreases as the molecular weight increases in the homologous series, methyl, ethyl, propyl, butyl, etc. In the polyhydric and aromatic alcohols the reaction is very slow. In the partial saponification of cellulose esters, it is frequently advantageous to have a relatively slow reaction in order to obtain better control. In these cases, the velocity of the reaction can be controlled to a considerable degree of employing an alcohol in the range propyl, butyl, etc.

The alcohol employed in the preparation of the alcoholate is not limited to aliphatic monohydric alcohols for polyhydric alcohols may be employed as well as aromatic alcohols, such as benzyl alcohol. The alcoholates of the aromatic and polyhydric alcohols seem to be just as effective as the alcoholate of the aliphatic monohydric alcohol when a low molecular weight aliphatic alcohol, such as methyl or ethyl alcohol is employed as the alcohol diluent in the reaction medium.

The conditions under which the reaction is carried out may be varied within wide limits. The temperature employed may be varied from the freezing point to the boiling point of the solvent or diluent employed in the reaction. In the homogeneous reaction, any solvent may be employed which does not react with the metal alcoholate catalyst such as ketones, stable chlorinated hydrocarbons, hydrocarbons both aliphatic and aromatic, ethers, etc. The proportion of alcohol employed as a diluent or reaction medium may be varied from molar quantities to several hundred per cent excess. When large excesses of alcohol are employed, the alcohol should be relatively free from water in order to prevent destruction of the catalyst. The concentration of catalyst (alcoholate) may be varied within wide limits from a mere trace to several per cent based on the weight of the ester. Since the reaction is a chain reaction, a mere trace (0.01–0.1%) of catalyst based on the weight of the ester is sufficient. The smaller the amount of catalyst employed, however, the slower is the rate of reaction. In the preferred procedure for the complete saponification of cellulose ester, in which sodium methylate is employed as the catalyst and methyl alcohol as the diluent or reaction medium, the reaction is carried out between 20 and 80° C. The concentration of catalyst ordinarily employed is from 5 to 10% based on the weight of the ester or even to 25% or 50% with higher fatty acid esters of cellulose and/or higher alcoholate catalysts such as sodium glycerinate, or from 0.05% to 0.1% based on the weight of the reaction medium.

In the heterogeneous process the cellulose ester may be steeped in the saponification bath or passed therethrough in a continuous band or the saponification liquid may be sprayed, spread, printed, etc. on the cellulose ester, film, yarn, fabric, etc. and later washed free.

While the process is generally applicable to cellulose esters of organic acids, it does not seem to be applicable to the inorganic esters of cellulose, attempts to regenerate cellulose from cellulose nitrate (denitration) being unsuccessful.

The most probable explanation for the mechanism of this invention is as follows:

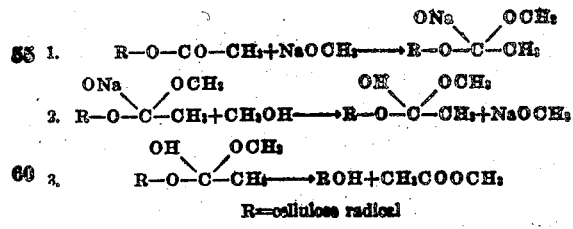

R=cellulose radical

The process of the present invention is of considerable fundamental importance in offering a method for regenerating the cellulose from cellulose esters under extremely mild conditions enabling the investigation of the degree of degradation of the cellulose in cellulose esters. From a commercial point of view this invention is of considerable interest from the point of view of the modification of yarn or fabrics prepared from cellulose esters, altho the invention may also be applied to the modification of the physical properties of cellulose ester films and foils. Thus, the dyeing characteristics, intangible properties such as luster, feel, weaving characteristics, etc., and heat resistance of cellulose esters may be altered by the process of the present invention. The process of the present invention permits the attainment of cross-dyeing effects on fabrics prepared from one cellulose ester material wherein a portion of the fabric in the desired design is partially or completely saponified prior to dyeing. This cross-dyeing process has not been feasible in the past with fabrics made from but one ester due to the slow rate of saponifications of the processes described in the prior art. The physical properties of ester fabrics are greatly modified by the degree of saponification. The luster of cellulose acetate fabric seems to be enhanced by a slight saponification but as the degree of saponification increases the luster to some extent decreases.

A subject which is of considerable commercial interest is the improvement in heating resistance of cellulose acetate fabrics. This has been accomplished in the past by partial saponification. The present invention is of considerable advantage over the prior art method in carrying out the partial saponifications because of the decrease in time involved in the treatment.

The process of the present invention is superior to those of the prior arts in that it is simple to operate, is less time consuming, and is less drastic in action. The greater simplicity of operation is due to the fact that the operation may be carried out at a lower temperature, the quantity of active reagent required is not so large, and the final saponified product is easier to purify, especially from excess alkali because of the smaller amount of caustic agents present. The extreme rapidity at which the saponification are effected by the process of the present invention makes it particularly advantageous over that of the prior art. This rapidity combined with the simplicity of operation makes the process most feasible as in obtaining cross-dyeing effects with cellulose acetate. The mild conditions under which the saponification of the present invention is carried out represents one of the most important advantages of the process. In the regeneration of cellulose from cellulose esters, it is highly desirable from the point of view of quality of the resulting cellulose not to degrade the cellulose during saponification. The cellulose in cellulose acetate is not degraded by the saponification procedure of the present invention, whereas the methods of the prior art such as aqueous saponifications are well known to be degrading in action due to alkaline oxidation of the cellulose. A further attainment of some importance is complete saponification of cellulose esters by the process of the present invention so that the resulting cellulose may be more completely recovered from the reaction media.

The above description and examples are intended to be illustrative only. Any modification of or variation therefrom which conforms to the spirit of the invention is intended to be included within the scope of the claims.

I claim:

1. Process for the saponification of a cellulose ester of an organic acid, which comprises bringing said ester in contact with an aliphatic monohydric alcohol of 1–2 carbon atoms in the presence of from 0.01 to 10% of a metal alcoholate.

2. Process for the saponification of a cellulose ester of an organic acid, which comprises bringing said ester in contact with an aliphatic monohydric alcohol of 1–2 carbon atoms in the presence of from 0.01 to 10% of an alkali metal alcoholate.

3. Process for the saponification of cellulose acetate, which comprises bringing said ester in contact with an aliphatic monohydric alcohol of 1-2 carbon atoms in the presence of from 0.01 to 10% of a metal alcoholate.

4. Process for the saponification of cellulose acetate, which comprises bringing said ester in contact with an aliphatic monohydric alcohol of 1-2 carbon atoms in the presence of from 0.01 to 10% of an alkali metal alcoholate.

5. Process for the saponification of a cellulose ester of an organic acid, which comprises bringing said ester dissolved in an inert solvent in contact with an aliphatic monohydric alcohol of 1-2 carbon atoms in the presence of from 0.01 to 10% of a metal alcoholate.

6. Process for the saponification of a cellulose ester of an organic acid, which comprises bringing said ester dissolved in an inert solvent in contact with an aliphatic monohydric alcohol of 1-2 carbon atoms in the presence of from 0.01 to 10% of an alkali metal alcoholate.

7. Process for the saponification of cellulose acetate, which comprises bringing said ester dissolved in an inert solvent in contact with an aliphatic monohydric alcohol of 1-2 carbon atoms in the presence of from 0.01 to 10% of a metal alcoholate.

8. Process for the saponification of cellulose acetate, which comprises bringing said ester dissolved in an inert solvent in contact with an aliphatic monohydric alcohol of 1-2 carbon atoms in the presence of from 0.01 to 10% of an alkali metal alcoholate.

9. Process for the saponification of a cellulose ester of an organic acid, which comprises bringing said ester in the solid state in contact with an aliphatic monohydric alcohol of 1-2 carbon atoms in the presence of from 0.01 to 10% of a metal alcoholate.

10. Process for the saponification of a cellulose ester of an organic acid, which comprises bringing said ester in the solid state in contact with an aliphatic monohydric alcohol of 1-2 carbon atoms in the presence of from 0.01 to 10% of an alkali metal alcoholate.

11. Process for the saponification of cellulose acetate, which comprises bringing said ester in the solid state in contact with an aliphatic monohydric alcohol of 1-2 carbon atoms in the presence of from 0.01 to 10% of a metal alcoholate.

12. Process for the saponification of cellulose acetate, which comprises bringing said ester in the solid state in contact with an aliphatic monohydric alcohol of 1-2 carbon atoms in the presence of from 0.01 to 10% of an alkali metal alcoholate.

13. Process for the saponification of cellulose acetate, which comprises bringing the same in contact with methanol in the presence of 0.05 to 0.1% of sodium methylate based on the weight of the cellulose at a temperature between 20° and 80° C.

14. The process which comprises mixing cellulose acetate with an alcohol of the group consisting of methyl alcohol and ethyl alcohol and an alkali metal alcoholate of the group consisting of from 0.01 to 10% of alkali metal methylates and alkali metal ethylates, maintaining the mixture until saponification of the cellulose acetate has taken place and then isolating the saponified cellulosic body from the saponifying mixture.

15. The process which comprises mixing a cellulose ester with an alcohol of the group consisting of methyl alcohol and ethyl alcohol and from 0.01 to 10% of an alkali metal alcoholate of the group consisting of alkali metal methylates and alkali metal ethylates, maintaining the mixture until saponification of the cellulose ester has taken place and then isolating the saponified cellulosic body from the saponifying mixture.

16. The process of claim 14 in which the alcohol is ethyl alcohol.

17. The process which comprises dissolving 10 grams of cellulose acetate containing about 54.5% combined acetic acid in 150 cc. of dioxane, cooling to 12° C., adding 18 cc. of 5% sodium methylate in methyl alcohol solution with agitation, maintaining the mixture at about 12° C. for 30 minutes and isolating the saponified cellulose.

18. The process for the saponification of a cellulose ester of an organic acid, which comprises bringing said ester in contact with an aliphatic monohydric alcohol of one to two carbon atoms in the presence of from 0.01 to 10% of a metal alcoholate, maintaining the mixture under reaction conditions until the saponification of the cellulose ester has taken place to such an extent that there is a distinct change in its dyeing characteristics.

19. The process for the saponification of cellulose acetate which comprises bringing said ester in contact with an alcohol of the group consisting of methyl and ethyl alcohol and from 0.01 to 10% of an alkli metal alcoholate, and continuing the reaction until the cellulose acetate has been saponified to such an extent that it is readily receptive to a viscose rayon-type dye.

ROLLIN F. CONAWAY.